(12) United States Patent
Kent

(10) Patent No.: US 8,850,305 B1
(45) Date of Patent: Sep. 30, 2014

(54) AUTOMATIC DETECTION AND MANIPULATION OF CALLS TO ACTION IN WEB PAGES

(75) Inventor: James Kent, London (GB)

(73) Assignee: Google Inc., Mountain View, CA (US)

( * ) Notice: Subject to any disclaimer, the term of this patent is extended or adjusted under 35 U.S.C. 154(b) by 163 days.

(21) Appl. No.: 13/407,648

(22) Filed: Feb. 28, 2012

Related U.S. Application Data

(60) Provisional application No. 61/577,925, filed on Dec. 20, 2011.

(51) Int. Cl.
*G06F 17/30* (2006.01)

(52) U.S. Cl.
USPC ........... 715/234; 707/915; 382/181; 382/190; 382/192; 382/199; 382/201; 382/202; 382/213

(58) Field of Classification Search
USPC ......... 382/181, 190, 192, 199, 201, 203, 213; 707/915; 715/234
See application file for complete search history.

(56) References Cited

U.S. PATENT DOCUMENTS

| | | | |
|---|---|---|---|
| 5,140,650 A * | 8/1992 | Casey et al. | 382/283 |
| 5,689,294 A * | 11/1997 | Karz et al. | 347/40 |
| 5,710,639 A * | 1/1998 | Kuznicki et al. | 358/426.03 |
| 6,470,094 B1 * | 10/2002 | Lienhart et al. | 382/176 |
| 6,633,314 B1 * | 10/2003 | Tuli | 715/744 |
| 7,162,493 B2 * | 1/2007 | Weiss et al. | 1/1 |
| 7,496,832 B2 * | 2/2009 | Chen et al. | 715/222 |
| 7,657,100 B2 * | 2/2010 | Gokturk et al. | 382/209 |
| 2002/0032677 A1 * | 3/2002 | Morgenthaler et al. | 707/3 |
| 2006/0103667 A1 * | 5/2006 | Amit et al. | 345/619 |
| 2008/0082426 A1 * | 4/2008 | Gokturk et al. | 705/27 |
| 2008/0168085 A1 * | 7/2008 | Chun et al. | 707/102 |
| 2010/0079374 A1 * | 4/2010 | Cortenraad et al. | 345/158 |
| 2010/0329578 A1 * | 12/2010 | Hatasawa et al. | 382/218 |

FOREIGN PATENT DOCUMENTS

WO   WO 03/098370   * 11/2003

* cited by examiner

*Primary Examiner* — Andrew Dyer
(74) *Attorney, Agent, or Firm* — Birch, Stewart, Kolasch & Birch, LLP

(57) ABSTRACT

Methods, systems, and articles of manufacture for the automatic determining of calls to action in a webpage are disclosed. These include, rendering a web page in a browser, capturing the rendered web page as an image, filtering the image using one or more image filters, and identifying the calls to action in the filtered image using at least one call to action selection criteria.

15 Claims, 8 Drawing Sheets

AUTOMATIC DETECTION AND MANIPULATION OF CALLS TO ACTION IN WEB PAGES

CROSS REFERENCE TO RELATED APPLICATIONS

The present application claims the benefit of U.S. Provisional Patent Application No. 61/577,925, filed on Dec. 20, 2011, entitled "Automatic Detection and Manipulation of Calls to Action in Web Pages," which is incorporated by reference herein in its entirety.

BACKGROUND

1. Field

This disclosure relates generally to the rendering of web pages.

2. Background

The website of an organization is an important aspect of its business and identity. With the vast majority of organizations establishing a presence on the web, it is increasingly important that their websites are designed to facilitate quick and efficient user interactions. In the case of an organization that offers some goods or services for sale, it is very important that a visitor to the website quickly recognizes what goods or services are offered for sale. A well designed website can direct a visitor's attention quickly and efficiently to the goods and/or services for sale, and to the next action the visitor is expected to take.

A "call to action," as used herein, is a key visual element in a webpage. Calls to action include buttons, check boxes, etc., that invite the user to perform an action on that corresponding call to action, such as, for example, by clicking on them. Calls to action may also include notices and other visual elements on a webpage that do not necessarily invite the user to click on them. The placement of calls to action in an optimal manner in a webpage helps facilitate quick and efficient interaction with visitors.

The conventional process of website design and redesign is primarily manual. A human evaluator views a webpage rendered in a browser, and then makes an evaluation as to how effective the webpage is for its intended purpose. This introduces substantial lab bias and subjectivity that may result in incorrect judgments and webpages with less than optimal designs.

It is therefore desired that automated methods and systems are available for designing and/or redesigning a webpage to facilitate quicker and more efficient interaction with visitors.

SUMMARY

Methods, systems, and articles of manufacture for the automatic determining of calls to action in a webpage are disclosed. These include, rendering a web page in a browser, capturing the rendered web page as an image, filtering the image using one or more image filters, and identifying the calls to action in the filtered image using at least one call to action selection criteria. The automatically determined calls to action may be reported to the user and/or may be used for automatically rearranging the webpage for improved user interaction.

Further features and advantages of the embodiments, as well as the structure and operation of various embodiments thereof, are described in detail below with reference to the accompanying drawings. It is noted that this disclosure is not limited to the specific embodiments described herein. Such embodiments are presented herein for illustrative purposes only. Additional embodiments will be apparent to persons skilled in the relevant art(s) based on the teachings contained in this disclosure.

BRIEF DESCRIPTION OF THE DRAWINGS/FIGURES

Reference will be made to embodiments, examples of which may be illustrated in the accompanying figures. These figures are intended to be illustrative, not limiting. Although the invention is generally described in the context of these embodiments, it should be understood that it is not intended to limit the scope of the disclosure to these particular embodiments.

DETAILED DESCRIPTION

While the disclosure refers to illustrative embodiments for particular applications, it should be understood that the disclosure is not limited thereto. Those skilled in the art with access to this disclosure will recognize additional modifications, applications, and embodiments within the scope of this disclosure and additional fields in which the disclosed examples could be applied.

Embodiments disclosed herein may be used to automatically determine the most prominent calls to action in a webpage. A "call to action," as noted above, is a key visual element in a web page. The effectiveness of a call to action in attracting the attention of those who visit a webpage may be based, at least in part, upon its prominence as a visual element in the webpage. A ranked list of calls to action detected in the webpage may be reported to the user, so that the user can determine how the design of the webpage corresponds to the goals for it. For example, the user may determine whether the highest ranked call to action is, as intended, directed to the primary goal of the webpage. By algorithmically determining the most prominent calls to action on a webpage, embodiments provide an objective method for evaluating the design of webpages. A ranked list of calls to action detected in the webpage provides an objective view of the most prominent calls to action and a view of the relative effectiveness of the detected calls to action. The disclosed methods for automatically evaluating webpages may be significantly faster and more consistent compared to evaluation by human "experts". By capturing the webpage as an image and then repeatedly applying image filters and feature detection techniques, the calls to action in the webpage are detected in an efficient and effective manner.

Embodiments may also be used to automatically rearrange calls to action in the webpage so that the webpage is more visually optimized to facilitate quick and efficient interaction with users. An iterative process of detecting most prominent calls to action, comparing the detected calls to action to goals, and rearranging the calls to action in the webpage according to rules may be used to fine-tune the webpage design.

Figure 1A:
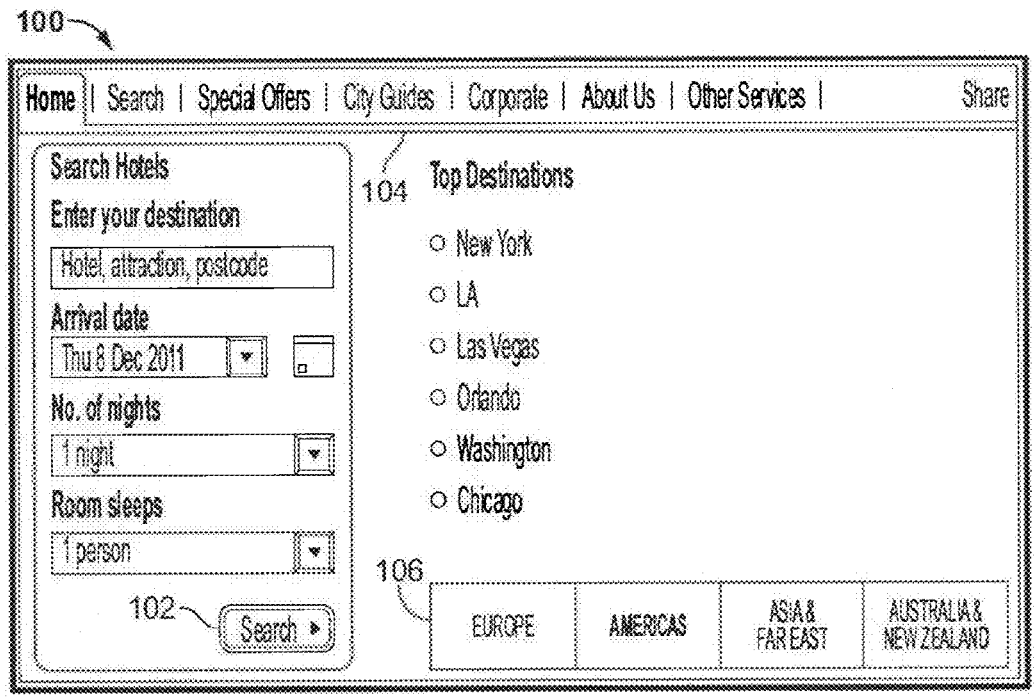
FIGS. 1A and 1B illustrate views of a webpage before and after processing in accordance with an embodiment.
Figure 1B:
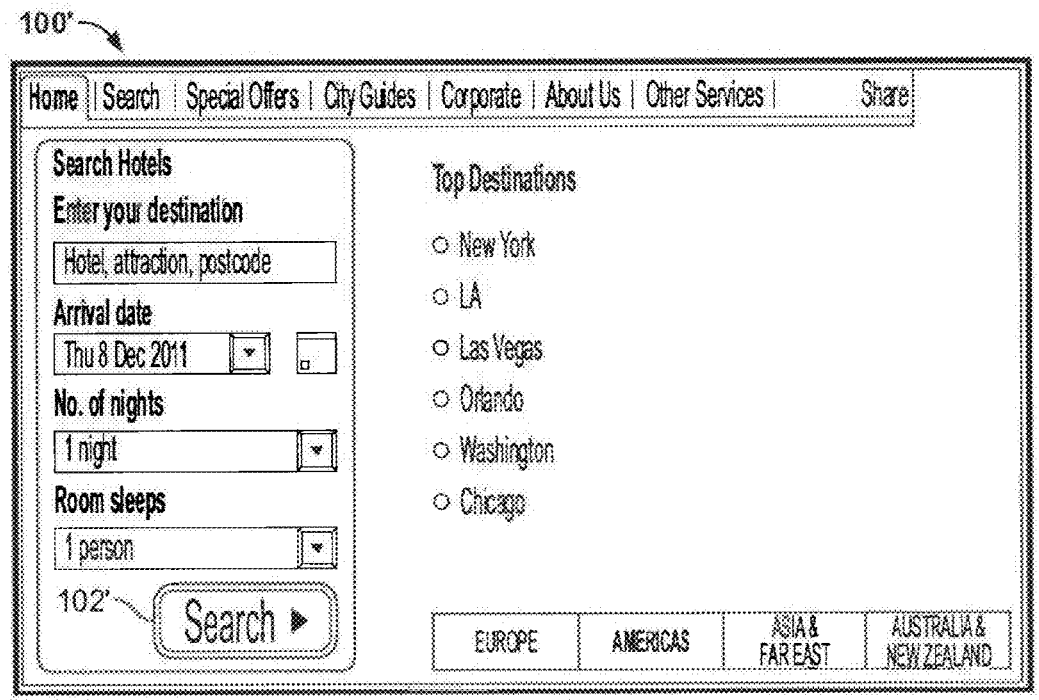

FIGS. 1A and 1B illustrate, respectively, exemplary views 100 and 100' of a webpage before and after processing the webpage according to an embodiment of the present invention. The goal for the webpage 100 may be to attract a visitor to click on the "search" button 102. In FIG. 1A, element 102 may not be detected as the most prominent call to action. For example, elements 104 and 106 may be ranked higher in visual prominence than 102 due to the characteristics of those elements relative to element 102. However, the goal of the webpage is to attract the visitor's attention to the search button (element 102), and the calls to action determined according to embodiments, showed that element 102, as it is, is not the most prominent call to action in the webpage.

FIG. 1B illustrates the webpage 100' resulting after processing webpage 100 shown in FIG. 1A according to an embodiment. The call to action 102', which should be the most prominent call to action consistent with the goals for the webpage, has been made larger so that it is visually more prominent than other detected calls to action. The attention of a visitor viewing the webpage of FIG. 1B is immediately directed to element 102,' in a manner consistent with the goals for the webpage.

Figure 2:
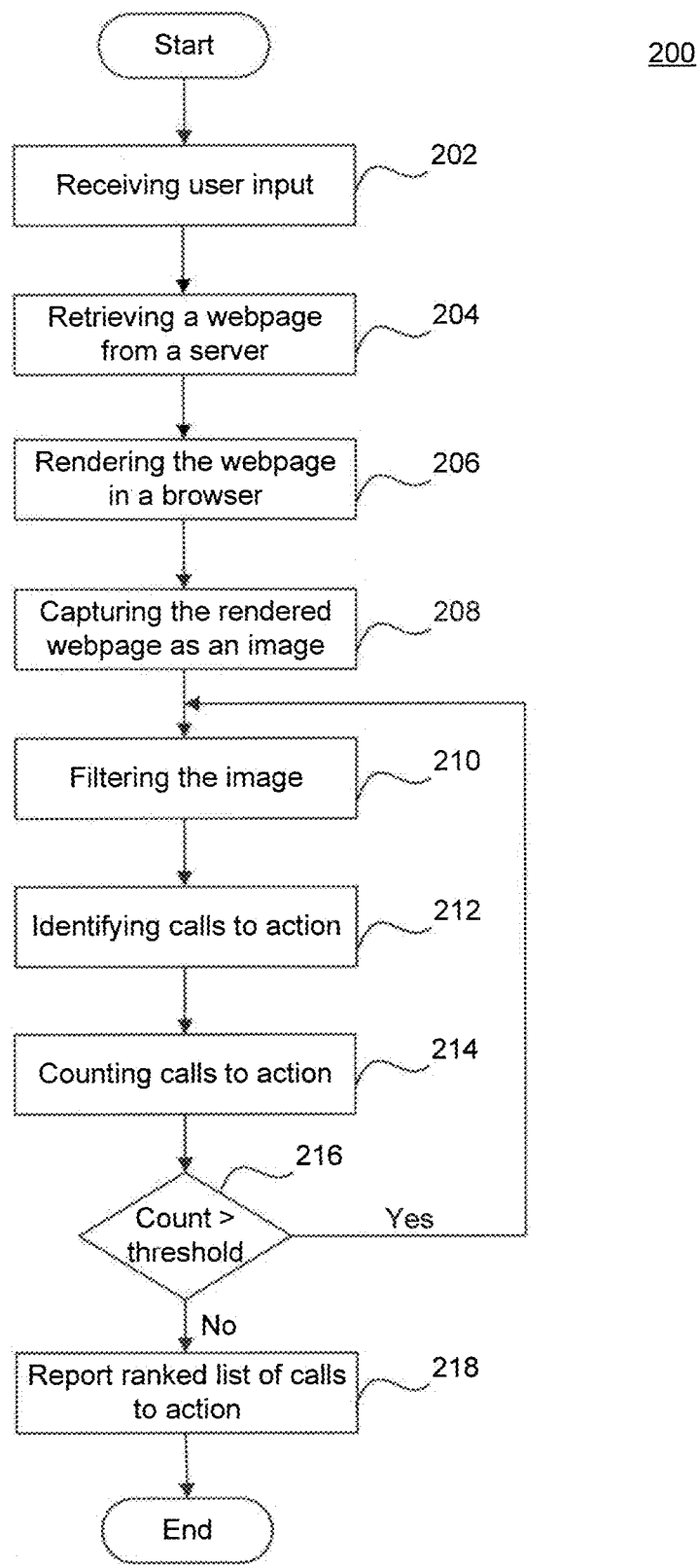
FIG. 2 illustrates a flowchart of a method for determining and reporting the calls to action in a webpage, according to an embodiment.

FIG. 2 illustrates a flowchart of a method 200 for determining and reporting calls to action in a webpage, according to an embodiment. According to an embodiment, the most prominent calls to action in the webpage are detected and reported. Method 200 can execute, for example, in a computer such as, a personal computer, laptop, tablet, smartphone, server, cloud-computer, or other computing device. At step 202, user input is received to access a webpage. For example, a user may input a uniform resource locator (URL) corresponding to the address of the webpage to be evaluated in a browser executing on the computer. The input may be entered through an input device directly connected to the computer, or one that is indirectly connected to the computer, such as, through a remote connection.

At step 204, the webpage corresponding to the URL entered by the user is retrieved. The webpage may be retrieved from a web server. According to an embodiment, the webpage may be retrieved from a local file storage. For example, method 200 can be used to evaluate webpages before they are deployed to a publically accessible web server.

At step 206, the retrieved webpage is rendered in the browser. The webpage, for example, may be received as a string of hypertext markup language (HTML). The browser parses the received HTML and a document object model (DOM) tree may be constructed. Additional hyper-text transfer protocol (HTTP) requests may be initiated to obtain images, stylesheets, JavaScript files and other objects to be displayed in the page. If available, one or more stylesheets may be parsed and necessary rendering information may be attached to the corresponding element in the DOM tree. Any Javascript may be executed, and subsequently the webpage may be rendered in the browser according to the DOM tree and stylesheets.

At step 208, the rendered webpage is captured as an image. According to an embodiment, the image capture should be executed only after all elements have been rendered in the webpage. The image capture may be performed by using any image capture utility. Some webpage image capture utilities capture only above the fold, and some others capture the area including below the fold. Embodiments may use either an above the fold image or an image that includes a below the fold view of the webpage. The captured image (of the webpage) may be stored in any image storage format, such as, but not limited to JPG and TIFF. According to an embodiment, the image is stored in Portable Network Graphics (PNG) format.

At step 210, one or more filters are applied to the image. Filtering, as described below, may include the application of an image filter, such as a black and white filter, and a feature detection, such as a corner-point detection to detect objects or elements in the image. According to other embodiments, filtering can also include the iterative application of a series of filters and feature detectors.

The capture of the webpage as an image, at step 208 above, enables the application of image filters and feature detectors to the captured image. This approach of performing filtering and detection upon an image of the webpage may be a more reliable approach to automatic detection of calls to action than approaches that do not first capture the rendered web page to an image. For example, although the HTML of the webpage may be parsed to identify calls to action based upon tags etc., such an approach may fail to detect many calls to action because not all calls to action will have associated recognizable HTML tags and/or other characteristic recognizable from the HTML stream. Capturing the rendered webpage as an image eliminates the need to rely upon the HTML stream of the webpage. However, embodiments may parse the HTML stream to confirm or reject a call to action detected based upon the captured image. For example, an element such as a button including recognizable text string may be detected based upon the image, and then, by parsing the webpage HTML for a tag indicating a button, one may confirm or reject that the webpage includes a button with the particular text string.

At step 212, the calls to action are identified from the filtered image of the webpage. Call to action selection criteria, i.e., criteria based upon which a visual element in the captured image of the webpage is considered a call to action, may be configurable. The elements or calls to action identified in step 210 may be evaluated to determine if they are above a particular level of visual prominence to be considered a call to action. For example, each detected element can be assigned a score reflecting its visual prominence, and the score can be compared to a threshold visual prominence score. The elements or calls to action that score above the threshold visual prominence score are considered to be the most prominent calls to action. The detected calls to action may be ranked in order of their respective scores.

At step 214, the identified calls to action are counted. For example, the number of most prominent calls to action, i.e., those calls to action that scored above the threshold visual prominence score, is determined.

At step 216, it is determined whether the count (i.e., number of identified calls to action) is greater than a threshold number of most prominent calls to action. The threshold number of most prominent calls to action may be configurable. According to another embodiment, the threshold number of most prominent calls to action may be dynamically determined based upon properties of the webpage, including, for example, the overall number of visual elements detected on the webpage. For example, when a large number of visual elements are detected (e.g., greater than 10) on a webpage, it may be considered an indication of a crowded webpage, and, therefore, the threshold number of most prominent calls to action may be set to a low value (e.g., 2) in order to require a higher level of visual prominence for the selected most prominent calls to action. For a webpage that has a small number of detected visual elements (e.g., less than 10), a higher number of elements may be selected as the threshold number of most prominent calls to action.

If, in step 216, it is determined that the count is greater than the threshold number of most prominent calls to action, then the processing of method 200 proceeds to step 210, and steps 210-216 can be iteratively executed until the count becomes less than or equal to the threshold number of most prominent calls to action. At each iteration of step 210, the same or different image filter or series of filters may be applied to the image. At each iteration of step 212, the same or different feature detector or group of feature detectors can be used to detect features in the image.

If, at step 216, it is determined that the count is less than or equal to the threshold number of most prominent calls to action, then processing of method 200 proceeds to step 218. At step 218, a ranked list of the calls to action in the webpage is generated. According to an embodiment, the list includes only the visually most prominent calls to action in the webpage. The list may be displayed, printed, stored and/or electronically transmitted to a configured destination.

The list may be used by a user to manually reorganize the webpage. According to another embodiment, the report can be used to guide an automatic process of rearranging the webpage to facilitate more effective user interaction.

Figure 3:
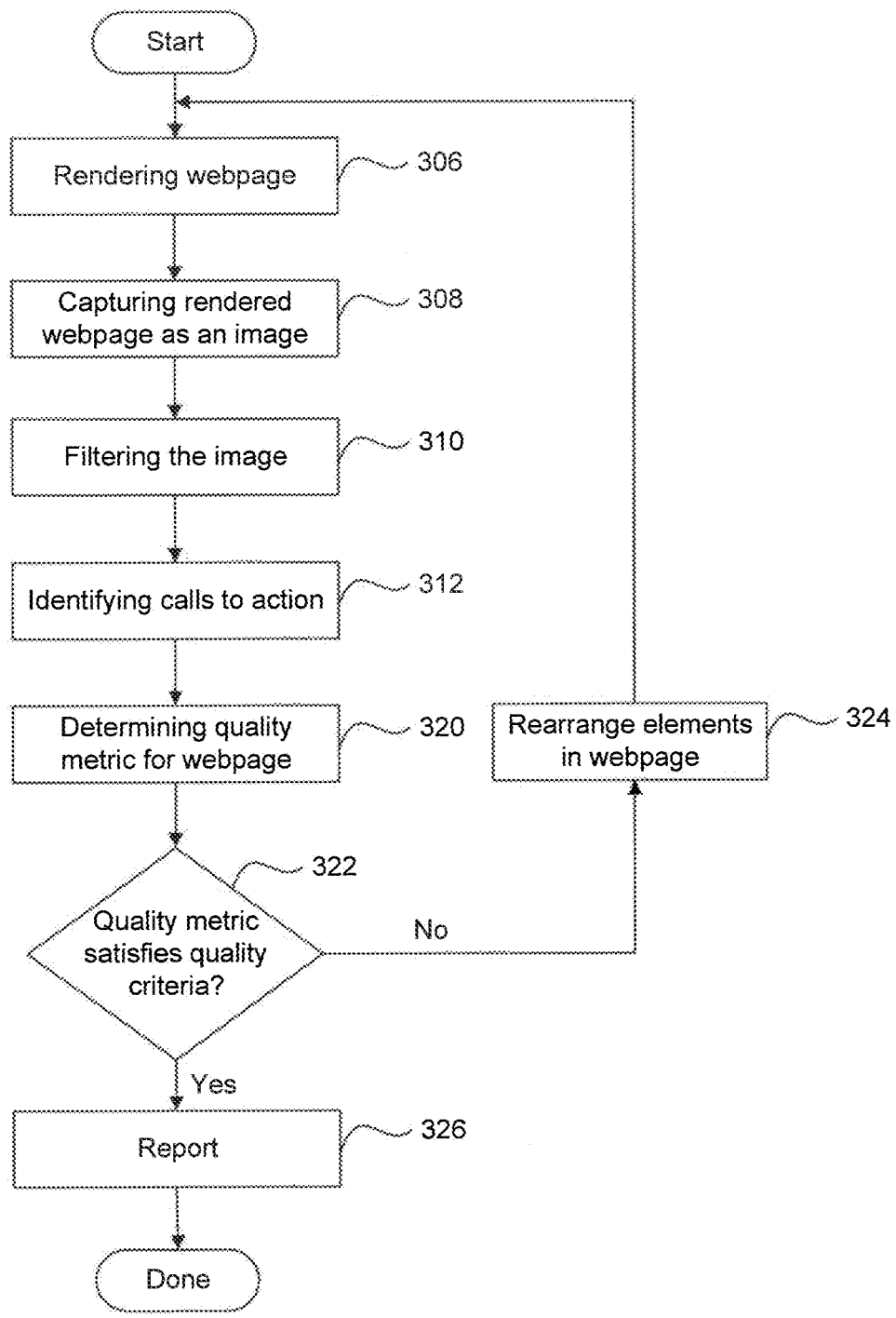
FIG. 3 illustrates a flowchart of a method for iteratively evaluating a website and automatically rearranging calls to action in a webpage, according to an embodiment.

FIG. 3 illustrates a flowchart of a method 300 for iteratively evaluating a website and for automatically rearranging calls to action in a webpage, according to an embodiment. Method 300 can be used, for example, to automatically evaluate a webpage for its calls to action, and then to reorganize the webpage to optimize its layout based on the results of the evaluation.

Steps 306-312 corresponds to steps 206-212, respectively, described above in relation to method 200. At the end of step 312, the calls to action are identified in the image of the webpage. According to an embodiment, the most prominent calls to action in the webpage are identified. After the completion of step 312, processing in method 300 proceeds to step 320.

At step 320, a quality metric is determined for the webpage. The quality metric, according to an embodiment, is a measure of how closely matched the detected calls to action are to the goals for the webpage. According to an embodiment, the goals for the webpage may be configured by the user as a ranked list of calls to actions. Then, the quality metric may be based upon the number of calls to action that were both detected and specified in configuration, expressed as a fraction or percentage. According to another embodiment, the quality metric may be based upon the whether or not the top detected call to action matched the configured goals. Other quality metrics may include, but are not limited to, whether or not the top call to action has a score above a configured threshold and/or above a configured level of difference relative to other detected calls to action.

At step 322, it is determined whether the quality metric found at step 320 is at or above a desired level. The quality metric, for example, can be compared to one or more quality criteria. The quality criteria may be configured. For example, in embodiments in which the quality metric is based upon how many of the detected most prominent calls to action match the goals, the quality criteria may specify that a particular percentage is matched.

If, at step 322, it is determined that the current quality metric does not satisfy the quality criteria, then processing of method 300 proceeds to step 324. At step 324, the webpage is rearranged. Thereafter, steps 306-322 may be repeated with the rearranged webpage. Steps 306-324 may be iteratively executed to repeatedly rearrange and reevaluate the webpage until the one or more quality criteria are satisfied at step 322. When the one or more quality criteria are satisfied at step 322, processing of method 300 proceeds to step 326 to optionally generate a report. As described in relation to step 218 above, the report may include a ranked list of calls to action in the reorganized webpage.

Rearranging the webpage at step 324 may be based upon the calls to action identified at step 312 and configured one or more goals. Rearranging the webpage can include, but is not limited to, changing the location, changing the size and/or shape, and/or changing the color, of one or more calls to action. The calls to action may be manipulated according to one or more rearranging rules. For example, a configured rearranging rule may specify that the call to action identified by the user as the most important should have at least a particular size of whitespace area around it. Other rearranging rules may specify relative and/or absolute sizes for the most prominent calls to action. A person of skill in the art would understand that numerous other rules may be specified for rearranging calls to action in the webpage.

Figure 4:
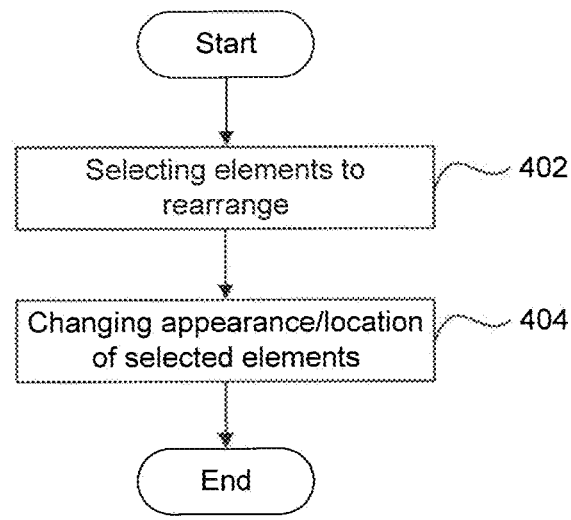
FIG. 4 illustrates a flowchart of a method for rearranging calls to action in a webpage, according to an embodiment.

FIG. 4 illustrates a flowchart of a method 400 (steps 402-404) for rearranging calls to action in a webpage, according to an embodiment. Method 400 can be used, for example, in performing step 324 of method 300 described above.

At step 402, one or more of the detected calls to action are selected to be rearranged. According to an embodiment, detected calls to action that have high scores in the current webpage but are not listed as a goal for the webpage, and detected calls to action that have low scores but are listed high in the goals, are selected for rearranging.

At step 404, the webpage is reorganized by manipulating respective ones of the selected calls to action from step 402. As described above, the rearrangement of the webpage may include changing the location of the particular calls to action in the webpage, and/or changing one or more of the color or size of the call to action. Moreover, as described above in relation to step 324 in method 300, the selected calls to action can be reorganized and/or rearranged according to configured rules.

According to an embodiment, the rearranging of the webpage can include, generating HTML corresponding to the reorganized webpage. This new webpage is subsequently rendered in a browser, captured as an image, and then subjected to processing to detect calls to action. According to another embodiment, the rearranging of the webpage is performed by modifying the image itself to move and/or alter the various calls to action in order to generate a new image, which is then evaluated for calls to action. When using the second approach, when a satisfactory layout in an image is obtained, that image and corresponding detected calls to action can be used to generate the HTML for the corresponding rearranged webpage.

Figure 5:
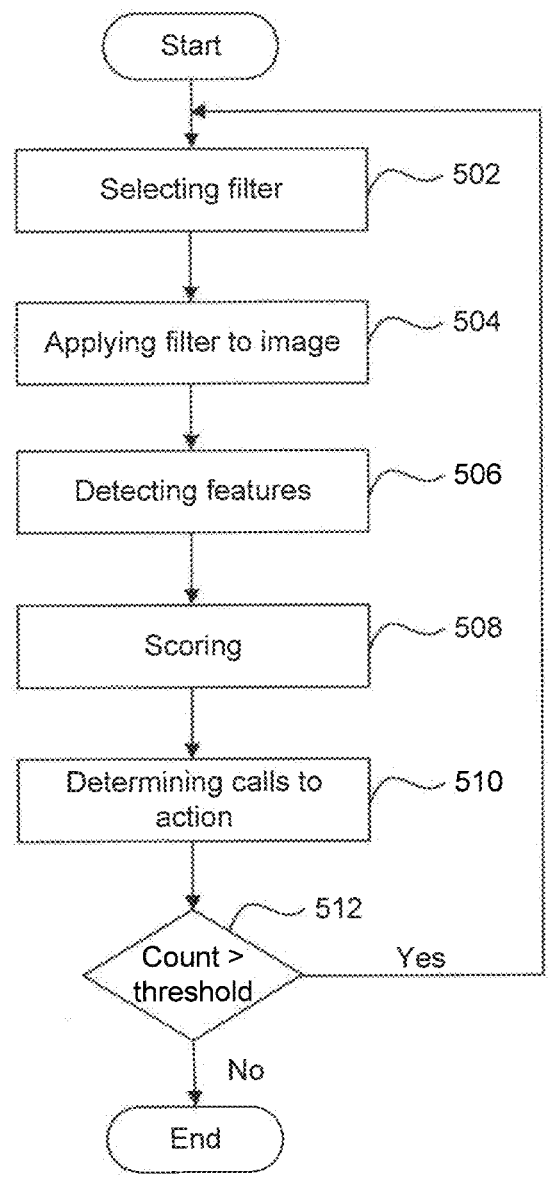
FIG. 5 illustrates a flowchart of a method for determining the most prominent calls to action in a webpage, according to an embodiment.

FIG. 5 illustrates a flowchart of a method 500 for determining the calls to action in a webpage, according to an embodiment. Method 500 can be used, for example, in performing steps 210 of method 200 and 310 of method 300. Method 500 can be used to repeatedly perform the steps of applying one or more image filters to the image, and detecting features in the image in order to determine calls to action, until the number of detected calls to action are below a configured threshold.

At step 502, a filter is selected. According to an embodiment, filters can be selected based upon a predetermined sequence from a pool of available filters. Exemplary filters include converting the image to grayscale, increasing the brightness of the image, thresholding the image to change the color of respective pixels based on a comparison of the grayscale value of the pixel and a threshold, convolution filters for at least one of blurring, sharpening, embossing, edge detection, and the like. According to an embodiment, a black and white filter is selected.

At step 504, the selected filter is applied to the captured image. As a result of applying the filter, the captured image may be modified. Further processing of the webpage is based upon the captured image as modified by applying the filter. According to an embodiment, the selected black and white filter is applied to the captured image. After the application of the black and white filter, the image is stored in memory and/or persistent storage for further processing.

At step 506, feature detection is performed upon the image. Feature detection may include, but is not limited to, detecting of edges, corners or interest points, and blobs. Exemplary feature detection techniques include corner-point detection and edge detection. Other feature detection techniques may be applied. According to an embodiment, the corner-point method of feature detection is applied to the image of the webpage. One or more filters, such as a black and white filter, may have already been applied to the image.

As part of the feature detection step, the detected features may be used to determine elements which may be calls to action. For example, a corner-point technique may detect one or more of the corners of a rectangular button. An element representing the button may be detected based upon the respective corner points detected around that element. Step 506 may result in the detection of one or more elements in the web page that may be calls to action.

At step 508, the detected elements or calls to action are scored. The scoring may include assigning a score to respective ones of the detected elements. The assigned score represents a measure of that element's likelihood as a call to action. The score assigned to each element may be based upon one or more criteria by which calls to action are determined. Scoring is further described below in relation to method 600.

At step 510, the most prominent of the detected calls to action are determined. The prominence of a detected call to action may be based upon its score, as assigned at step 508 above. Determining the most prominent calls to action may include determining those detected calls to action that have a score above a particular threshold (e.g., threshold visual prominence score), and then ranking those calls to action in order of their respective scores. The element with the highest score may be considered as the element that has the highest likelihood to be a call to action.

At step 512, the number of detected calls to action that are considered to be most prominent calls to action are compared to a threshold number of most prominent calls to action. As described above, the threshold number of most prominent calls to action may be configured or may be dynamically determined.

If, at step 512, it is determined that the number of the detected most prominent calls to action exceeds the threshold number of most prominent calls to action, then processing of method 500 proceeds to step 502. Steps 502-512 may be iteratively performed in order to apply one or more of the same or different image filters to the captured image, as modified by the image filters applied in the one or more previous iterations, until the detected number of most prominent calls to action is below the threshold number of most prominent calls to action.

When, at step 512, it is determined that the detected number of most prominent calls to action is no longer above the threshold number of most prominent calls to action, method 500 ends.

Figure 6:
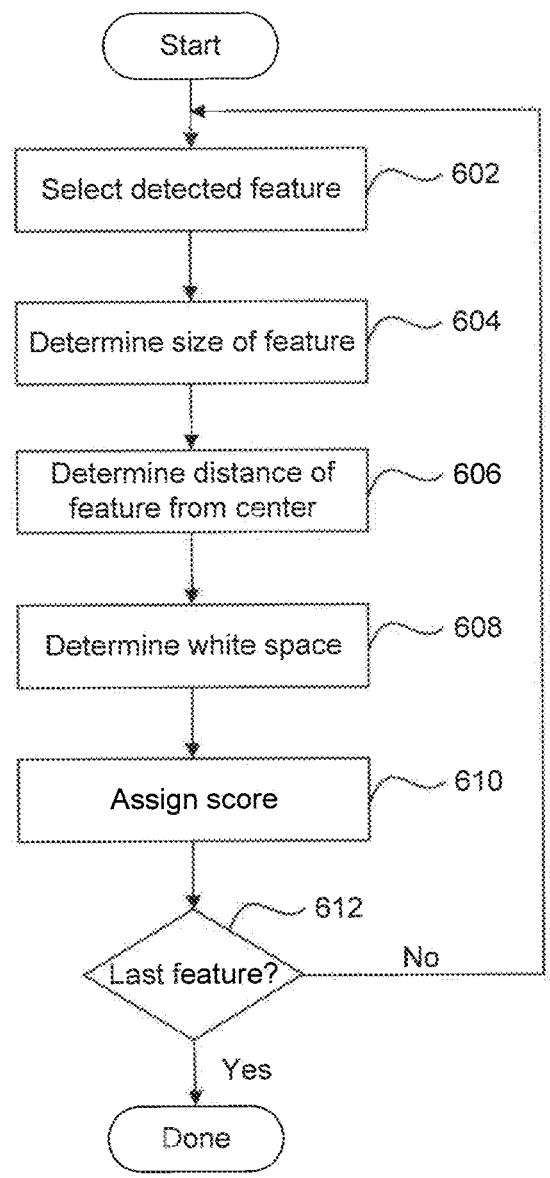
FIG. 6 illustrates a flowchart of a method for assigning scores to respective calls to action, according to an embodiment.

FIG. 6 illustrates a flowchart of a method 600 (steps 602-612) for assigning scores to respective calls to action, according to an embodiment. Method 600 can be used, for example, in performing step 508 of method 500 described above. Steps 602-612 can be repeated for each detected element for which a score is to be assigned. In the described embodiment, a combined score is determined based upon several characteristics of calls to action. A person of skill in the art would understand, however, that a score can be determined based upon any one or more of the characteristics described below and/or one or more other characteristics.

At step 602, a detected feature is selected. In each iteration of method 600, the next detected feature may be selected according to any ordering of the detected features.

At step 604, a size of the detected feature is determined. According to an embodiment, the size of the detected feature may be represented by the area of the corresponding element (e.g., button, radio button, input box, etc.). The area may be represented as an absolute value based upon measuring unit or as a percentage or fraction of the total area of the browser display area.

At step 606, a distance from the center of the browser display area to the selected detected feature is determined. This distance is sometimes referred to as a measure of gravity corresponding to the detected feature.

At step 608, the whitespace around the selected detected feature is determined. The whitespace associated with the selected detected feature can be expressed as a measure of the size of the whitespace relative to the size of the selected detected feature. The size of the whitespace associated with the selected detected feature can also be expressed as an absolute value.

At step 610, a score is calculated for the detected feature based upon one or more of the size of the feature, distance from the center to the feature, and size of associated white space. The score may be based on a combination of the above characteristics, for example, a sum or a weighted sum. The weights may, for example, be configurable for each characteristic.

At step 612, it is determined whether there are any more detected features for which scores should be assigned.

Figure 7:
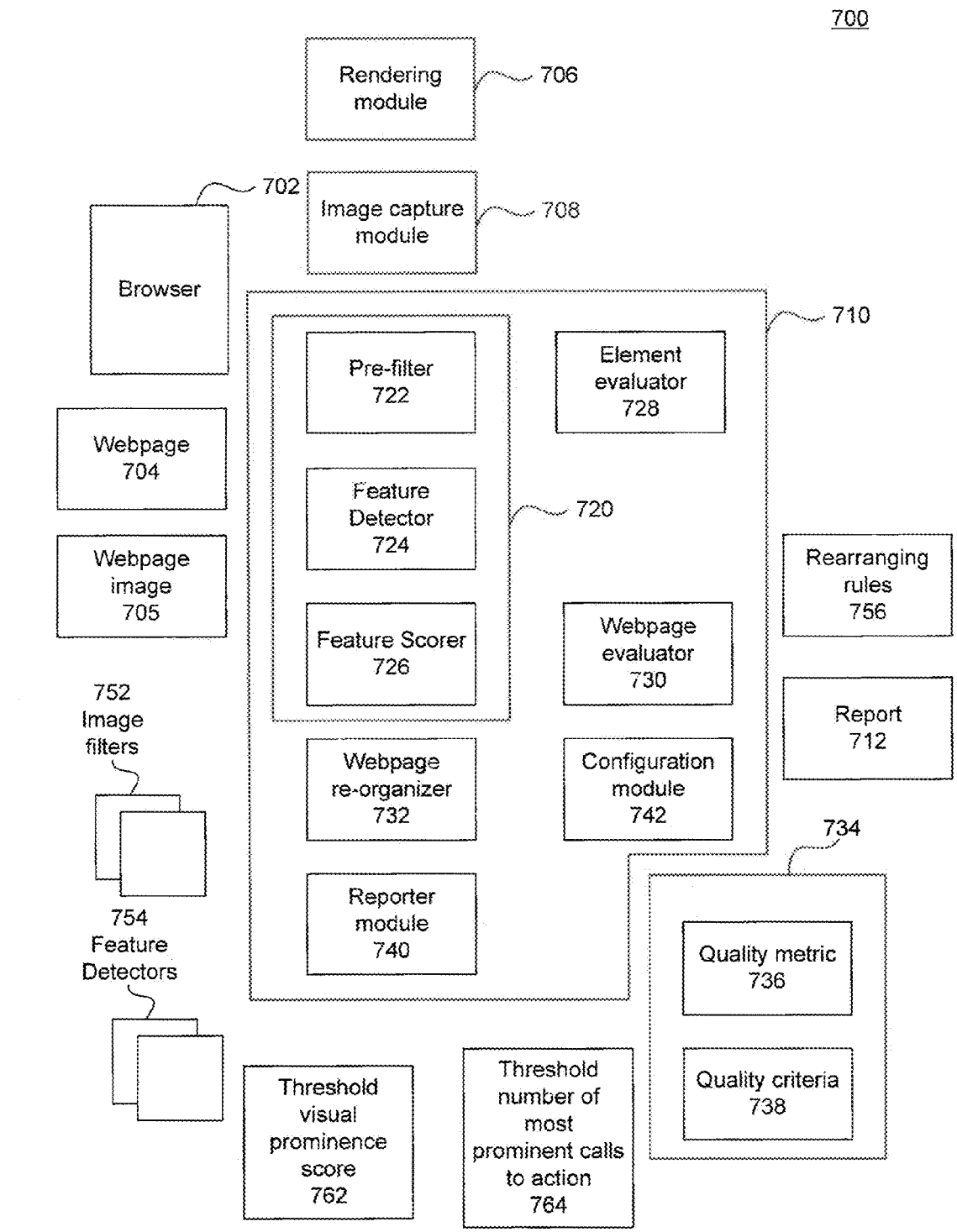
FIG. 7 illustrates a system for determining and/or manipulating calls to action in a webpage, according to an embodiment.

FIG. 7 illustrates a system 700 for determining and/or manipulating calls to action in a webpage, according to an embodiment. System 700 includes, a browser 702, a webpage 704, a webpage image 705, a rendering module 706, image capture module 708, call to action processing module 710, call to action quality configurations 734, one or more image filters 752, one or more image feature detectors 754, and rearranging rules 756. Call to action processing module 710 includes a filtering module 720, an element evaluator 728, a webpage evaluator 730, a webpage reorganizer 732, a configuration module 742, and a reporter module 746. Filtering module 720 includes a pre-filter 722, a feature detector 724, and a feature scorer 726. Quality configurations include a quality metric 736, and quality criteria 738.

System 700 may be implemented in a computer, such as the computer system 800 described below in relation to FIG. 8. The rendering module 706 may render webpage 704 in browser 702. Image capture module 708 captures the rendered webpage as an image 705. Call to action quality configurations 734 may be configured to include quality criteria 738. According to an embodiment, quality criteria include the goal for the webpage, for example, specified as a number of the most prominent calls to action. One or more image filters 752 include a black and white filter. One or more feature detectors 754 include a corner-point detector.

Call to action processing module 710 operates to detect and manipulate calls to action. Filtering module 720 detects calls to action in webpage image 705. Specifically, pre-filter module 722 applies one or more filters 752 to the captured image 705. Feature detector 724 operates to detect calls to action in the filtered image using a feature detector 754 such as, for example, a corner-point detector. Feature scorer 726 operates to assign scores to the detected most prominent calls to action in a webpage.

Element evaluator 728 operates to determine the calls to action from the detected elements. For example, element evaluator 728 may determine which detected features are most prominent calls to action based upon a threshold visual prominence score 762. Filtering module 720 may operate to iteratively apply pre-filter module 722 and feature detector 724 until the number of detected calls to action is less than or equal to a threshold number of most prominent calls to action 764.

Webpage evaluator 730 operates to determine a quality metric 736 for the webpage based upon the currently detected most prominent calls to action. The determined quality metric 736 may be compared to configured quality criteria 738 to determine whether the webpage needs to be further reorganized. Webpage reorganizer 732 operates to reorganize the webpage until quality criteria 738 is satisfied. Webpage reorganizer 732 may operate according to rearranging rules 756. Rearranging rules 756 specify rules according to which webpage rearranging may be achieved. Rearranging rules 756 may include, for example, a rule specifying that the call to action specified as the goal should be rearranged with substantially increased associated whitespace.

Reporter module 740 operates to generate a report 712 including information associated with the detected calls to action. According to an embodiment, report 712 includes a ranked list of the most prominent calls to action detected for the webpage.

Configuration module 742 operates to provide for the manual and/or dynamic configuration of parameters including quality criteria 736, threshold visual prominence score 762, and threshold number of most prominent calls to action 764.

Figure 8:
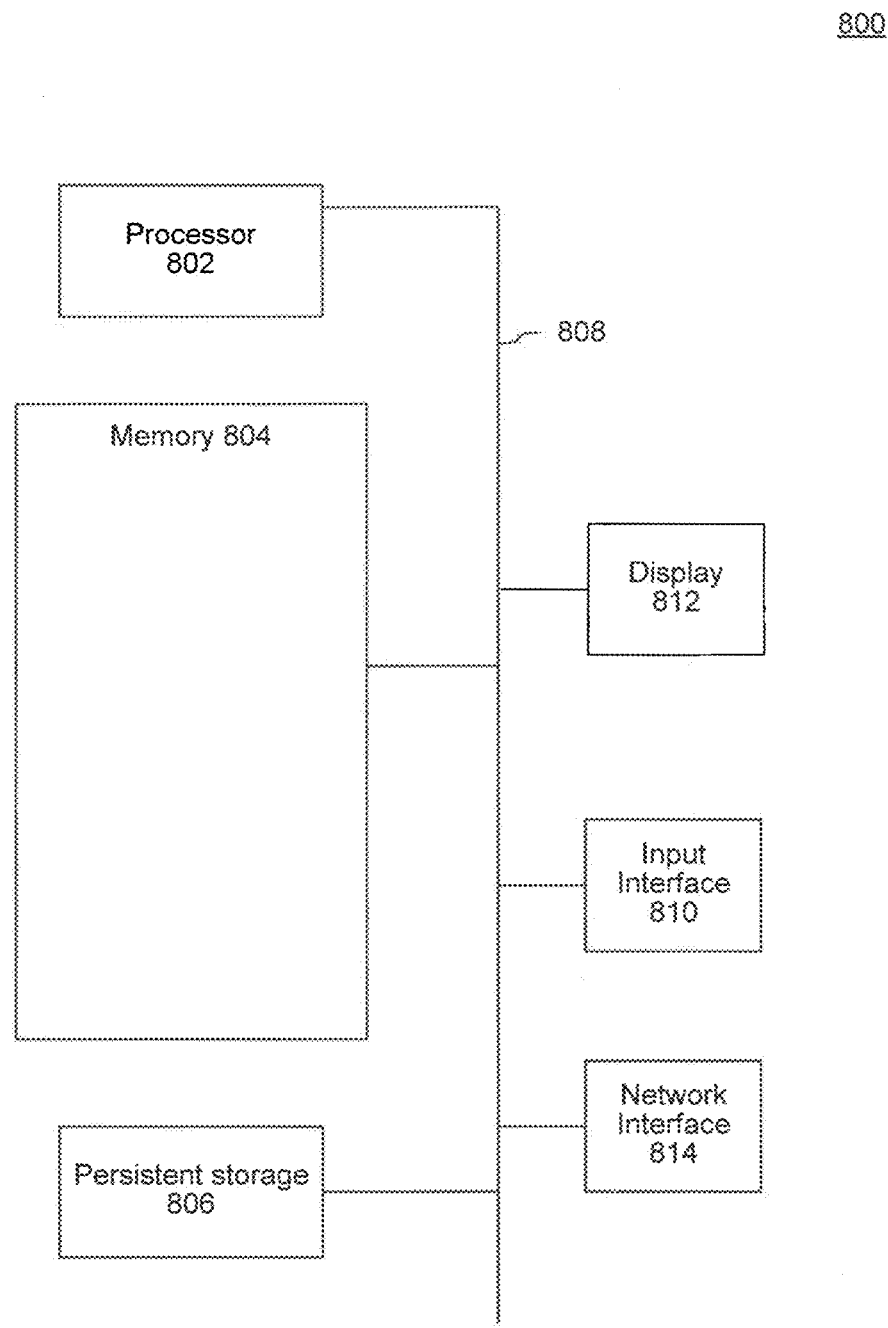
FIG. 8 illustrates a computer system in which embodiments can be executed.

FIG. 8 illustrates a block diagram of a computer system 800 in which embodiments can be executed. Computer system 800 can include a server computer, personal computer, laptop computer, tablet computer, smartphone, cloud computer, cluster computer, and/or other computing device. Computer system 800 includes a processor 802, a volatile memory 804, a persistent storage 806, an interconnection infrastructure 808, an input interface 810, a display 812, and one or more network interfaces 814. Processor 802 can be a processor, such as, but not limited to, a microprocessor, field programmable gate array (FPGA), or digital signal processor (DSP). Volatile memory 804 can include a random access memory (RAM) or like memory. Persistent memory 806 can include a persistent data storage medium such as a hard-disk or flash-memory storage device. Interconnection infrastructure 808 operates to communicatively couple modules of computer system 800. According to an embodiment, interconnection infrastructure 808 comprises at least one communications bus.

Network interface 814 operates to provide connectivity for local or remote networks (not shown) to computer system 800. Network interface 814 may include Ethernet, WIFI, Bluetooth, Cellular Internet, or other connectivity.

The embodiments have been described above with the aid of functional building blocks illustrating the embodiment of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described illustrative embodiments, but should be defined only in accordance with the following claims and their equivalents.

What is claimed is:

1. A computer-implemented method, comprising:
   (a) rendering, by one or more processors, a web page in a browser;
   (b) capturing, by the one or more processors, the rendered web page as an image;
   (c) establishing a threshold number of calls to action;
   (d) filtering, by the one or more processors, the image using one or more image filters;
   (e) identifying, by the one or more processors, a plurality of calls to action in the filtered image using at least one call to action selection criteria, the calls to action comprising visual elements in the rendered web page, wherein the identifying comprises:
      detecting features in the filtered image;
      assigning scores to respective detected features; and
      determining whether a detected feature represents a call to action based upon the assigned scores;
   (f) counting the identified calls to action;
   (g) comparing the count to the threshold number; and
   (h) in response to a counted number of identified calls to action being larger than the threshold number, iteratively executing operations (d)-(g) until the counted number of calls to action is less than or equal to the threshold number, and
   (i) in response to a counted number of identified calls to action being equal to or less than the threshold number, generating and reporting the counted identified calls to action.

2. The method of claim 1, wherein the detecting features include:
   applying a corner-point detection technique to identify one or more features in the filtered image.

3. The method of claim 1, wherein the assigning scores include:
   determining sizes of respective detected features; and
   determining a score for respective detected features based at least upon the corresponding determined size.

4. The method of claim 1, wherein the assigning scores include:
   determining, for respective detected features, a distance to a center of the filtered image; and
   determining, for respective detected features, a score based at least upon the corresponding determined distance to the center.

5. The method of claim 1, wherein the assigning scores include:
   determining, for respective detected features, whitespace associated with the detected feature; and
   determining, for respective detected features, a score based at least upon the corresponding determined whitespace.

6. The method of claim 1, wherein the identifying further comprises:
   determining a quality metric for the web page based upon the assigned scores.

7. The method of claim 1, further comprising:
   (i) reporting information associated with the identified calls to action.

8. The method of claim 1, further comprising:
   (j) determining a quality metric for the web page based upon at least the identified calls to action;
   (k) comparing the determined quality metric to at least one quality criteria;
   (l) automatically rearranging objects in the web page; and
   (m) iteratively executing operations (a)-(l) until the determined quality metric satisfies the at least one quality criteria.

9. The method of claim 8, wherein automatically rearranging objects in the web page includes:
   selecting, based upon configured goals, one or more of the calls to action to be rearranged; and
   changing at least one of appearance and location of the selected calls to action in the web page, wherein the changing is performed according to configured optimization rules.

10. The method of claim 8, wherein the quality metric includes an ordered list of the identified calls to action.

11. The method of claim 1, wherein the filtering includes applying a color filter to reduce colors in the image.

12. The method of claim 1, wherein the filtering includes converting the image to a black and white image.

13. A system, comprising:
   at least one processor;
   a memory coupled to the at least one processor;
   an image capture module configured to be executed by the at least one processor and further configured to capture a rendered web page as an image; and
   an image filtering module configured to be executed by the at least one processor and further configured to:
   (a) establish a threshold number of calls to action;
   (b) filter the image using one or more image filters;
   (c) identify a plurality of calls to action in the filtered image using at least one call to action selection criteria, the calls to action comprising visual elements in the rendered web wherein the identifying comprises:
   detecting features in the filtered image;
   assigning scores to respective detected features; and
   determining whether a detected feature represents a call to action based upon the assigned scores;
   (d) count the identified calls to action;
   (e) compare the count to the threshold number; and
   (f) in response to a counted number of identified calls to action being larger than the threshold number, iteratively executing operations (b)-(e) until the counted number of calls to action is less than or equal to the threshold number, and
   (g) in response to a counted number of identified calls to action being equal to or less than the threshold number, generating and reporting the counted identified calls to action.

14. The system of claim 13, further comprising:
   a reporter configured to be executed by the processor and further configured to report information associated with the identified calls to action.

15. An article of manufacture comprising a nontransitory computer readable storage medium having encoded instructions thereon that, in response to execution by a computing device, cause the computing device to perform operations comprising:
   (a) rendering the web page in a browser;
   (b) capturing the rendered web page as an image;
   (c) establishing a threshold number of calls to action;
   (d) filtering the image using one or more image filters;
   (e) identifying a plurality of calls to action in the filtered image using at least one call to action selection criteria, the calls to action comprising visual elements in the rendered web page, wherein the identifying comprises:
   detecting features in the filtered image;
   assigning scores to respective detected features; and
   determining whether a detected feature represents a call to action based upon the assigned scores;
   (f) counting the identified calls to action;
   (g) comparing the count to the threshold number; and
   (h) in response to a counted number of identified calls to action being larger than the threshold number, iteratively executing operations (d)-(g) until the counted number of calls to action is less than or equal to the threshold number, and
   (i) in response to a counted number of identified calls to action being equal to or less than the threshold number, generating and reporting the counted identified calls to action.

* * * * *